(12) United States Patent
Fabre et al.

(10) Patent No.: US 7,034,685 B2
(45) Date of Patent: Apr. 25, 2006

(54) GARMENT INCORPORATING ANTENNA FOR IDENTIFYING ARTICLES TO BE SORTED

(75) Inventors: Bruno Fabre, Cavaillon (FR); Guy Venture, Senas (FR)

(73) Assignee: Neopost Industrie, Bagneux (FR)

( * ) Notice: Subject to any disclaimer, the term of this patent is extended or adjusted under 35 U.S.C. 154(b) by 112 days.

(21) Appl. No.: 10/733,477

(22) Filed: Dec. 11, 2003

(65) Prior Publication Data

US 2004/0140897 A1    Jul. 22, 2004

(30) Foreign Application Priority Data

Dec. 13, 2002  (FR)  ................... 02 15798

(51) Int. Cl.
*G08B 13/14*    (2006.01)
(52) U.S. Cl. ............... 340/572.1; 340/572.7; 340/10.1; 235/385
(58) Field of Classification Search ............ 340/572.1, 340/572.4, 572.7, 572.8, 10.1; 235/385, 235/435, 439
See application file for complete search history.

(56) References Cited

U.S. PATENT DOCUMENTS

| | | | |
|---|---|---|---|
| 5,896,087 A | | 4/1999 | Frowein ............... 340/572.1 |
| 6,098,886 A | * | 8/2000 | Swift et al. ............ 235/472.01 |
| 6,677,917 B1 | * | 1/2004 | Van Heerden et al. ...... 343/897 |
| 6,714,133 B1 | * | 3/2004 | Hum et al. ............... 340/573.4 |
| 6,842,116 B1 | * | 1/2005 | Hum et al. ............... 340/573.4 |
| 6,853,293 B1 | * | 2/2005 | Swartz et al. .............. 340/5.92 |

FOREIGN PATENT DOCUMENTS

DE   19530391 A1   2/1997
WO   WO 01/45038 A2   6/2001

OTHER PUBLICATIONS

Patent Abstracts of Japan, Publication No. 200235220—and English translation.

* cited by examiner

Primary Examiner—Toan N. Pham
(74) Attorney, Agent, or Firm—Perman & Green, LLP

(57) ABSTRACT

This invention relates to an interrogator device for identifying articles each provided with a transponder, comprising radio-frequency (RF) interrogation means for obtaining identifying information on each of the articles, these RF interrogation means comprising an RF antenna coupled to an electronic module for processing the identifying information issuing from the transponders, and the RF antenna comprises two flat coils each incorporated on two opposite ends of a garment worn by an agent in charge of collecting the articles arranged loose over a storage area, and connected to the electronic module worn by the agent by communication lines incorporated in the garment, the electronic module comprising discrimination means for determining pertinent identifying information from a plurality of identifying information obtained from the transponders through said RF antenna.

9 Claims, 1 Drawing Sheet

GARMENT INCORPORATING ANTENNA FOR IDENTIFYING ARTICLES TO BE SORTED

BACKGROUND OF THE INVENTION

1. Field of the Invention

The present invention relates to the domain of logistics and the sorting of various articles, and more particularly to the localization, identification and collection of loose articles stored in general stores, warehouses or workshops, prior to being processed.

2. Brief Description of Related Developments

The localisation of loose articles in storage areas raise numerous problems, particularly when it is question of doing so rapidly and without errors.

One known solution consists in providing these articles with a bar code and in giving each of the agents in charge of collecting these articles a portable reading device.

Unfortunately, apart from the fact that such a solution is often a source of reading errors, it proves to be inefficient when it is a question of finding the sought-for parcel among a pile of loose parcels, as it requires reviewing each parcel in order to read the bar code which is generally printed on one face only or at a determined place on the parcel which must also be sought.

This is a reason why solutions which employ electronic RFID (radio frequency identity device) marking are used at the present time. Apart from their presenting a longer life and a greater capacity for updating the marking, these solutions avoid having to turn the parcels over, as the reading devices, also called RFID interrogators, do not require a particular positioning of the electronic marking with respect to the detection antenna of the RFID interrogator, contrary to the bar code readers which involve a face to face arrangement.

Unfortunately, RFID devices still suffer considerable shortcomings. In effect, in practice, due to their relatively broad range and their wide coverage, it has proved particularly delicate for an agent to find an article presenting a determined electronic marking corresponding to a desired sorting criterion, from among a quantity of other likewise marked articles, disposed loose side by side over a storage area for example, and all in that case coming within the field of reading of the same RFID interrogator.

It is an object of the present invention to overcome these drawbacks by proposing a system for localising and automatically identifying articles, which is both simple and economical.

SUMMARY OF THE INVENTION

These objects are attained by an interrogator device for identifying articles each provided with a transponder, comprising a radio-frequency (RF) interrogation system for obtaining identifying information on each of the articles. The RF interrogation system includes an RF antenna coupled to an electronic module for processing the identifying information from the transponders. The RF antenna is incorporated on two opposite ends of a garment wearable by an agent in charge of collecting loose articles arranged in a storage area, and connected to a electronic module wearable by the agent by communication lines incorporated in the garment. The electronic module includes a discrimination device for determining pertinent identifying information from the plurality of identifying information obtained from the transponders through said RF antenna.

In this way, an agent fitted with a garment incorporating such an article-identifying RF antenna will very rapidly be able to localise and take the article sought for, particularly when it is lying in a pile of loose articles. This would not have been possible with the conventional reading devices due to their lack of selectivity.

In one example, the RF antenna may comprise two flat coils woven either on the cuffs of the garment or on two gloves worn by the agent. The lines for communicating with the electronic module are, in the latter case, arranged in a sheath passing underneath the agent's garment.

The electronic module comprises a comparator for comparing the identifying information obtained from the various transponders with references relative to the articles to be identified, and thus validating, as they are being collected, the articles read by the agent, and a memory for storing said references relative to the articles to be identified.

The electronic module preferably provides a visual and/or audible indication to inform the agent of the result of the identification made by the comparator.

This electronic module advantageously further comprises a short range infrared transceiver for receiving the references relative to the articles to be identified, from a remote data-processing assembly.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENT(S)

Figure 1:
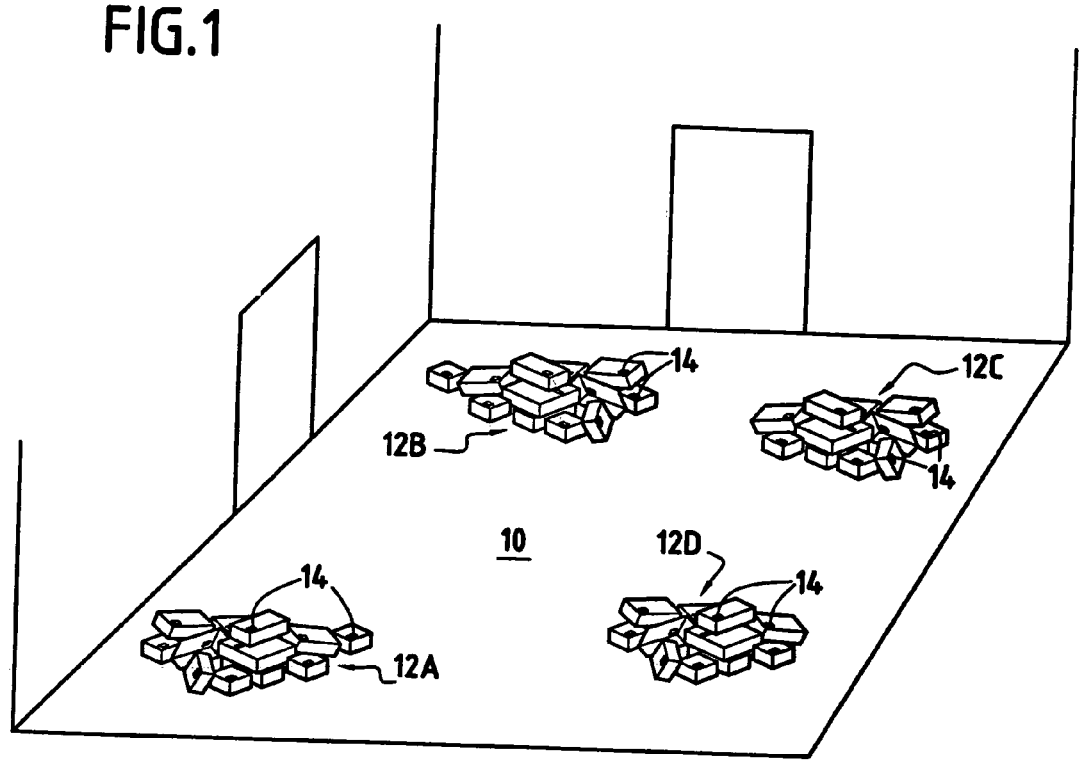
FIG. 1 illustrates a typical area for storing parcels.

Referring now to the drawings, an area for storing parcels is illustrated in FIG. 1. It will be noted that, in this storage area 10, which may for example be a workshop of a company transporting express parcels, the parcels are loose, such as in piles 12A–12D, each pile resulting, for example, in particular from the unloading of one or more vehicles coming from the same origin.

At the present time, in order to effect an RFID identification, all the parcels are each provided, as soon as they are closed, with an RFID tag 14 which is for example embedded in (or affixed on or borne by) a wall of the parcel and which will serve for its identification both by the transporter (to determine the addressee thereof) and by the final user (to determine the contents of this parcel).

These miniaturised tags, also called transponders, conventionally comprise a receiver for receiving a first radio signal and for returning a second, different, radio signal bearing pertinent identifying information for the application in question and relative, in the present case, to the contents and/or destination of the parcels. The receiver a coil/antenna for the emission/reception of the radio signals and by an electronic chip for processing (coding and decoding, in particular) the identifying information contained in these radio signals. The electronic chip integrates a memory which may be read-only, read/write only or multiple read/write. The operating frequency of the transponder may preferably be chosen, depending on the local regulations in force, in the low frequency range (9 kHz to 135 kHz), but also in the high frequency range (13.56 MHz).

Figures 2, 3:
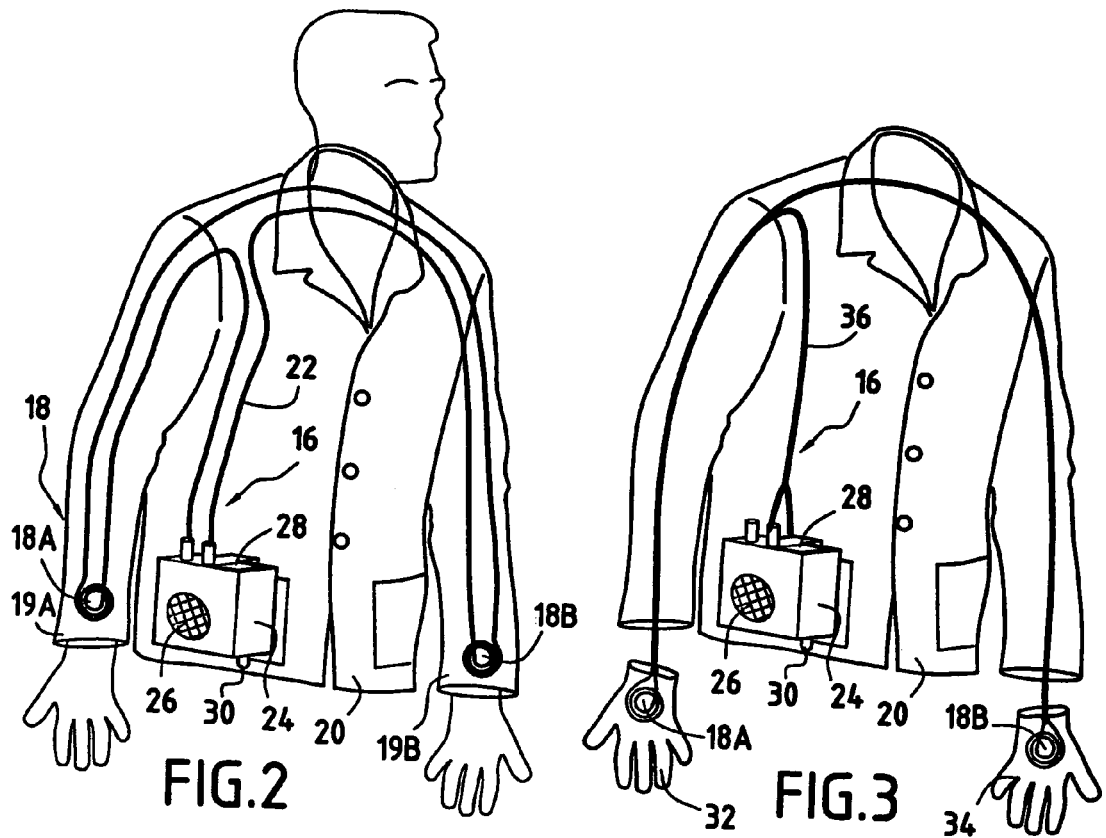
FIG. 2 shows a first example of an interrogator garment according to the invention.
FIG. 3 shows a second example of an interrogator garment according to the invention.

According to the invention, and as illustrated by the first example of embodiment of FIG. 2, the interrogator 16 comprises an antenna 18 especially adapted to RFID emissions and comprising for example two flat coils 18A, 18B directly integrated in the opposite end parts, or inner cuffs 19A and 19B, of the two sleeves of a garment 20 intended to be worn by an agent. These coils may be adhesively fixed or, better, woven directly with the garment, as disclosed for example by U.S. Pat. No. 5,896,087. The two coils of this RF antenna are conventionally coupled via communication lines 22 to a self-supplied electronic module 24 comprising, in a known manner, an RF source and electronic components (power supply (preferably a rechargeable battery), modulator, detector, converter, processing unit) necessary for remote supply of the transponders and for processing the identifying information received by each antenna element and exchanged between the electronic module and the transponders. According to the invention, this electronic module further comprises a discrimination device for determining pertinent identifying information from a plurality of identifying information obtained from the transponders by each of the two coils of the RF antenna.

The electronic module, which may for example be worn on the belt, comprises, likewise conventionally, at the level of its processing unit, a comparator for comparing the identifying information obtained from the transponders with references relative to the sought for parcels previously stored in a memory of this processing unit intended to store these references, and thus for validating the articles collected as they are identified on the storage area.

Visual and/or audible indicator 26 is, of course, integrated in the electronic module to inform the agent of the result of the identification. The electronic module 24 further includes a screen 28 on which the agent can visualise the different search parameters which will have been previously recorded in the interrogator from a short range link interface 30, advantageously of the infrared (for example Firewire) type, with a management computer (not shown).

In a particular form of embodiment, the electronic module 24 may be in the form of a universal electronic device such as an organiser, personal assistant or graphic tablet, suitably programmed to perform RFID processing.

A second form of embodiment of the invention, allowing greater selectivity (due to a possible closer and therefore better contact with the article to be found), is illustrated in FIG. 3. In this embodiment, the double-coil antenna 18 is no longer incorporated in a work garment but in two gloves 32, 34 that may be worn by the agent. More precisely, when the antenna is constituted by two flat coils, the latter are advantageously each woven on the palm of these two gloves. The link between the antenna and the electronic module 24 of the interrogator is made by communication lines 22 mounted in a sheath 36 which is advantageously passed underneath the agent's garments.

The system according to the invention operates as follows: The list of the parcels to be found having been previously loaded in the electronic module 24 from the management computer (via its infrared link 30 which ensures the automatic transfer of the list of parcels to be found into the internal memory of the electronic module), the agent can then pass around the storage area 10 in search of the parcel or parcels to be found. He will go towards the different piles of parcels and in each of them will touch (preferably simply by placing his hands) and if necessary displace certain of these parcels until he finds the parcel or parcels sought. The presence of the coils 18A, 18B on each of his hands or fore-arms ensures a great directivity and very great selectivity for the interrogator of the invention which will validate the located parcel only if the signals delivered by the two antenna elements have each allowed a similar detection of the sought for parcel (of which the references may for example be displayed on the electronic module).

In addition, the use of the interrogator according to the invention leaves the agent's hands free to hold the parcels better. Moreover, the interrogator is very simple to place in position, the agent having only an overall or gloves to put on and an electronic module to wear.

What is claimed is:

1. Interrogator device for identifying articles each provided with a transponder, comprising radio-frequency (RF) interrogation means for obtaining identifying information on each of the articles, said RF interrogation means comprising an RF antenna coupled to an electronic module for processing the identifying information issuing from the transponders, wherein said RF antenna is incorporated on two opposite ends of a garment worn by an agent in charge of collecting said articles arranged loose over a storage area, and connected to said electronic module worn by the agent by communication lines incorporated in the garment, said electronic module comprising discrimination means for determining pertinent identifying information from the plurality of identifying information obtained from the transponders through said RF antenna; and wherein said RF antenna comprises two flat coils disposed on portions of clothing covering the extremities of the arms of the agent, the portions of the clothing being the cuffs of two sleeves of the garment or two gloves worn by the agent, the leads linking to the electronic module being disposed in a sheath passed underneath the agent's garment, planes of the coils being parallel during a normal orientation of the agent's arms to provide selectivity and directivity for the locating of an article.

2. The device of claim 1, wherein the two flat coils are woven on the cuffs of the garment and planes of the coils are disposed parallel to the axes of the respective cuffs.

3. The device of claim 1, wherein the two flat coils are woven on the two gloves in the palms of the gloves.

4. The device of claim 1, wherein the electronic module comprises comparison means for comparing the identifying information obtained from the transponders with references relative to the articles to be identified, and thus validating, as they are being collected, the articles read by the agent.

5. The device of claim 4, wherein said electronic module comprises memory means for storing said references relative to the articles to be identified.

6. The device of claim 4, wherein it further comprises visual and/or audible indication means for informing the agent of the result of the identification made by said comparison means.

7. The device of claim 4, wherein said electronic module further comprises short range emission/reception means for receiving said references relative to the articles to be identified, from a remote data-processing assembly.

8. The device of claim 7, wherein said short range emission/reception means are of infrared type.

9. Garment incorporating antenna for identifying articles each provided with a transponder, comprising an RF antenna formed by two flat coils each incorporated on the two cuffs of the garment worn by an agent in charge of collecting the articles arranged loose over a storage area, and intended to be connected by communication lines incorporated in the garment to an electronic module for processing the identifying information issuing from the transponders carried by the agent, said electronic module comprising discrimination means for determining pertinent identifying information from a plurality of identifying information obtained from the transponders through said RF antenna; and wherein planes of the coils are parallel during a normal orientation of the agent's arms to provide selectivity and directivity for the locating of an article.

\* \* \* \* \*